Oct. 20, 1964   C. A. BEIHL   3,153,554
TONGS
Filed Jan. 29, 1962

CLARENCE A. BEIHL
INVENTOR.

BY
ATTORNEY 3,153,554
TONGS
Clarence A. Beihl, 631½ Alta St., Monrovia, Calif.
Filed Jan. 29, 1962, Ser. No. 169,303
2 Claims. (Cl. 294—28)

This invention relates to hand implements for taking hold of articles.

An important feature of this invention is its teaching of a construction for tongs having two rods hinged together with one rod having a handle adapted to be grasped by an operator with the fingers of his hand wrapped around the handle, and the other rod being adapted to be engaged by the operator's thumb, whereby the tongs may be opened and closed through sideways flexing of the thumb. The handle arrangement provided by this invention makes the tongs especially well suited for use in handling bottles, e.g. nursing bottles, as in removing the bottles from a sterilizer.

It is an object of this invention to provide a pair of tongs for easy handling of bottles and adapted to grasp and hold a bottle in a steady and firm manner.

A general object is to provide tongs of the above-mentioned character which are simple and rugged in construction, convenient to use, and economical to manufacture.

Further objects and advantages of the invention will appear in the course of the following part of this specification wherein the details of construction and mode of operation of a preferred embodiment are described with reference to the accompanying drawings, in which.

Figure 1:
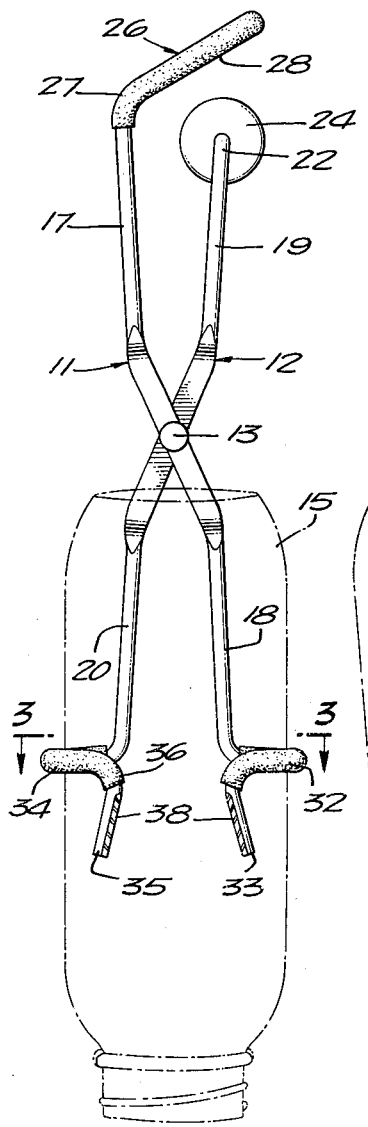
FIGURE 1 is a front elevation of a pair of tongs of this invention shown in position of gripping a bottle.
Figure 2:
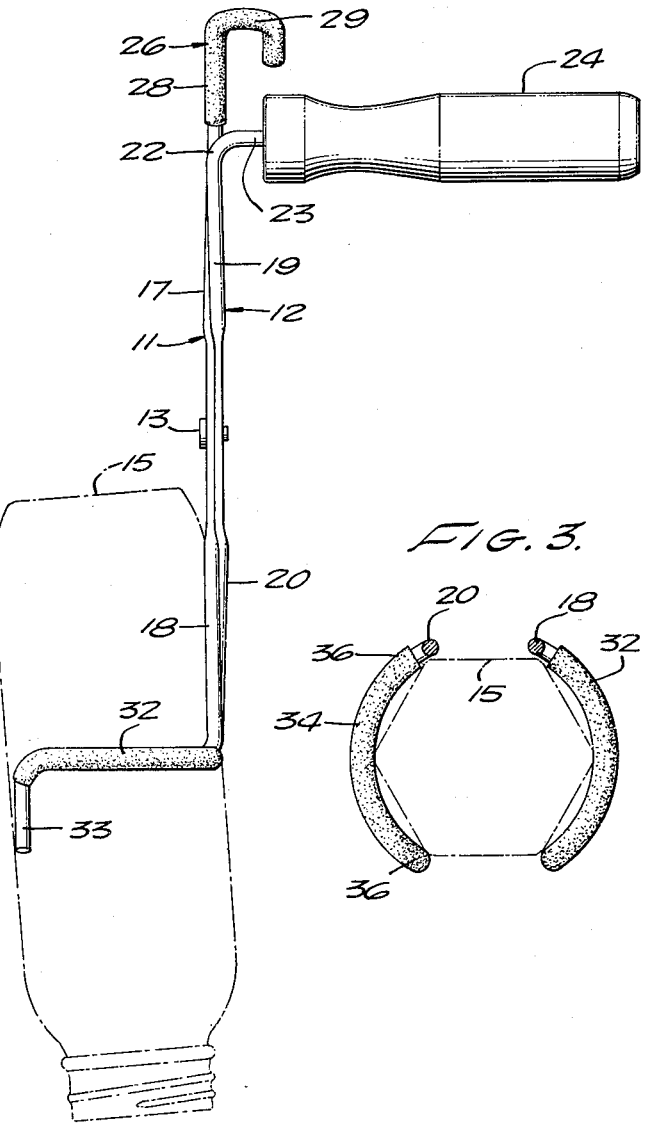
FIGURE 2 is a side elevation of the tongs and bottle.
Figure 3:
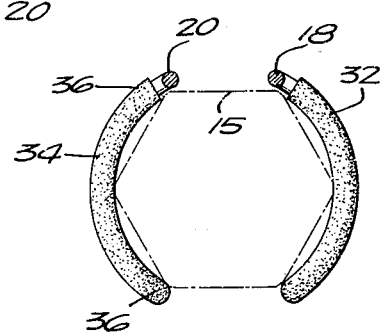
FIGURE 3 is a cross section taken upon a plane indicated in FIGURE 1 by line 3—3; and, FIGURE 4 is a front view of the tool end of the tongs shown in closed position.

The illustrated tongs comprise two cross rods 11 and 12 hinged together intermediate their ends as with a pivot pin or rivet 13 for opening and closing movements in a scissor-like fashion. The upper end of the pair of tongs as depicted is its handle end and the lower end is its tool end. The tongs are shown in FIGURES 1–3 holding a baby nursing bottle 15 in an upside down position of removing the bottle from the sterilizer.

The lengths or sections of the rods 11 and 12 extending from the pivot pin 13 to the handle end portions thereof are herein referred to as arms, and the sections extending from the pivot pin to the tool end portions of the rods are referred to as legs, reference numerals 17 and 18 designating the arm and leg lengths respectively of rod 11 and numerals 19 and 20 designating the arm and leg respectively of rod 12. The rods are preferably flattened at their places of crossing. In the illustrated embodiment the arms and legs extend and swing in a common plane normal to the axis of the pivot pin 13.

At the handle end of rod 12, the rod is bent at 22 to provide an end portion 23 extending in a direction normal to the plane defined by the two arms 17 and 19, for mounting a hand grip 24, preferably secured non-rotatably on the end portion 23. The hand grip 24 is thus adapted to be grasped by an operator with the fingers of his hand extending circumferentially of the hand grip and with his thumb extended for engagement with the handle end portion of rod 11.

The handle end portion of the rod 11 is designated by reference numeral 26, it being bent at 27 from the upper end of the arm 17 to incline in a direction inwardly toward and above the hand grip 24. The end portion 26 is preferably covered by a rubber tube 28 to provide a friction cushion for engagement by the operator's thumb, and is also preferably formed to a loop shape as indicated at 29 to present a larger surface for thumb engagement. The arm 17 is longer than the arm 19 to extend loop handle 29 above the hand grip 24 whereby the tongs may be operated comfortably with the operator's thumb bearing upon the loop handle 29 and with his fingers wrapped around the hand grip 24. Thus by the operator flexing his thumb from side to side relative to the axis of the hand grip 24 he opens or closes the tongs.

At the tool end of the tongs the rods 11 and 12 are bent to provide an arcuate portion 32 and tang 33 for rod 11, and corresponding arcuate portion and tang 34 and 35 for rod 12. The arcuate portions are bowed outwardly with respect to each other for complementary action in gripping the bottle 15 between them with the arcuate portions extending circumferentially of the bottle. Each of the arcuate portions is preferably covered with a rubber tube, as indicated at 36 for arcuate portion 34 and they extend in a common plane normal to the plane defined by the legs 18 and 20.

The tangs 33 and 35 are preferably serrated as indicated at 38 in their mutually facing surfaces so that the tongs may be employed to pick up small articles, as, for instance, the caps and nipples for the baby bottles from a sterilizer. The tangs 33 and 35 extend from the ends of their respective arcuate portions 32 and 34 in a common direction normal to the plane of the arcuate portions and in a direction opposite of that of the handle end of the tongs. Such relationship of the arcuate portions extending in a plane normal to the plane defined by the legs 18 and 20, and the tangs 33 and 35 extending in a direction normal to the plane of the arcuate portions, provide an arrangement of parts in which a bottle 15, for example, when grasped between the arcuate portions will be engaged by the legs 18 and 20 and also by the tangs 33 and 35 so as to steady the bottle and securely hold it against wobbling or slipping while being lifted.

The hand grip 24 being held in the palm of the operator's hand with his fingers encircling the hand grip and with his thumb bearing upon the loop handle 29, and in the case where the hand grip 24 is non-rotatably secured on the handle end portion 23 of rod 12, operation of the tongs is such that, in effect, rod 12 is held steady while it is the rod 11, through flexing of the thumb sideways with respect to the axis of the hand grip 24, that swings on the pivot 13 in the opening and closing operations of the tongs.

Figure 4:
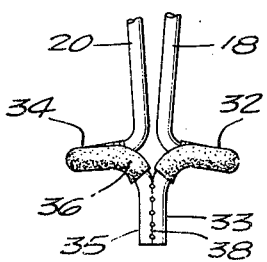

FIGURE 4 shows the tool end portion of the tongs in closed position with its tangs 33 and 35 adjacent each other as for picking up a small article.

While the particular tongs herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A nursing bottle handling tool for use in transferring bottles to and from a hot sterilizer, said tool comprising a pair of long rods hinged together at an intermediate portion thereof and formed to provide a pair of arcuate jaws at one end shaped to embrace and grip a nursing bottle between its ends, said jaws lying in a plane generally normal to the intermediate portion of the rods with the adjacent intermediate portions of said rods engaged against the sides of the bottle to aid in supporting the same against tilting movement within the jaws, tangs on the free ends of said jaws extending away from the hinge connection lying generally parallel to said intermediate portion of the rods and cooperating therewith in steadying a bottle against tilting movement in said jaws, and the ends of said rods remote from said jaws having a handgrip on one end thereof and a thumb rest on the other thereof positioned to be engaged by the user's thumb while his hand proper grasps said handgrip, said thumb rest being manipulatable by the user's thumb to control the movement of said jaws.

2. A nursing bottle handling tool as defined in claim 1 characterized in that said tangs are so disposed that their adjacent sides lie substantially parallel to one another in the closed position thereof and cooperate to serve as gripping tongs, and the adjacent sides of said tangs being serrated to facilitate the gripping action thereof.

References Cited in the file of this patent
UNITED STATES PATENTS

| | | |
|---|---|---|
| 97,399 | Holmes | Nov. 30, 1869 |
| 1,566,234 | Seward | Dec. 15, 1925 |
| 2,559,978 | Marco | July 10, 1951 |